Feb. 21, 1928.

C. H. AYARS 1,659,555

VEGETABLE TOPPING MACHINE

Filed Jan. 16, 1926

3 Sheets-Sheet 1

WITNESSES:
Alfred E. Tschinger
George A. Gruss

INVENTOR:
Charles H. Ayars,
BY
Joshua R. H. Potts
ATTORNEY.

Feb. 21, 1928.

C. H. AYARS 1,659,555

VEGETABLE TOPPING MACHINE

Filed Jan. 16, 1926      3 Sheets-Sheet 2

WITNESSES:

INVENTOR:
Charles H. Ayars,
BY
Joshua R. H. Potts
ATTORNEY.

Feb. 21, 1928.

C. H. AYARS 1,659,555

VEGETABLE TOPPING MACHINE

Filed Jan. 16, 1926  3 Sheets-Sheet 3

WITNESSES:
Alfred E. Lichinger
George A. Gruss

INVENTOR:
Charles H. Ayars,
BY
Joshua R. H. Potts
ATTORNEY

Patented Feb. 21, 1928.

1,659,555

UNITED STATES PATENT OFFICE.

CHARLES H. AYARS, OF SALEM, NEW JERSEY, ASSIGNOR TO AYARS MACHINE COMPANY, OF SALEM, NEW JERSEY.

VEGETABLE-TOPPING MACHINE.

Application filed January 16, 1926. Serial No. 81,703.

My invention relates to vegetable topping machines.

In preparing vegetables, such as beets, for canning, it is essential that the tops should be removed and the object of my invention is to provide simple and effective means for removing the tops.

Figure 1:
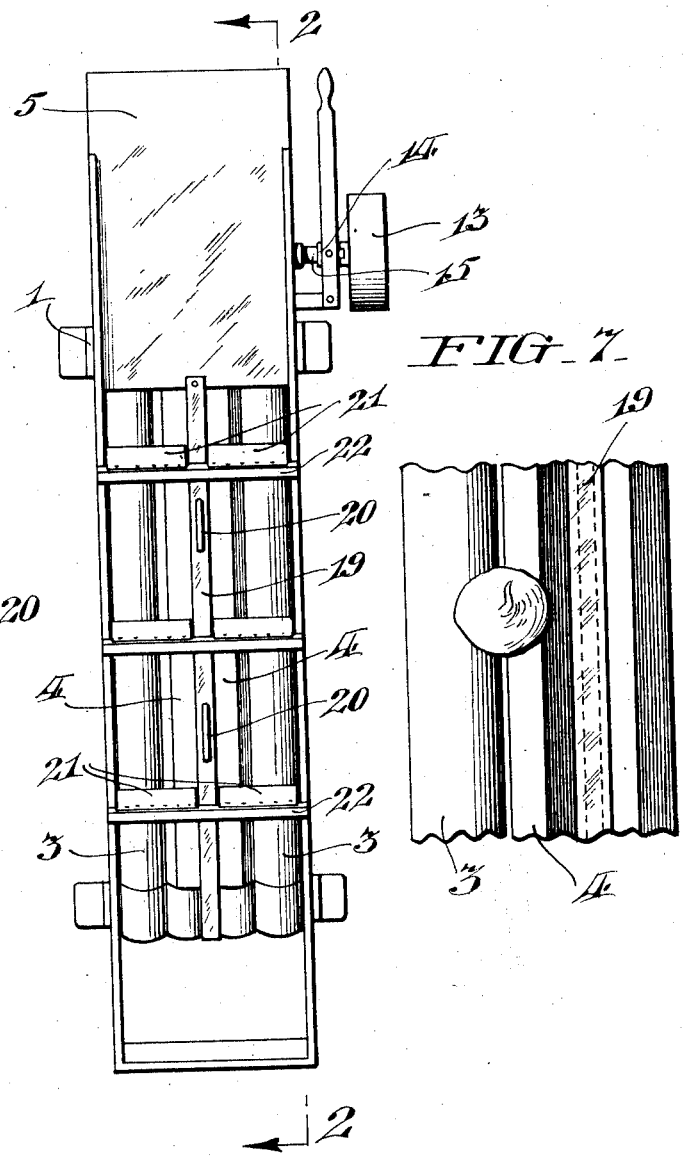
Figure 2:
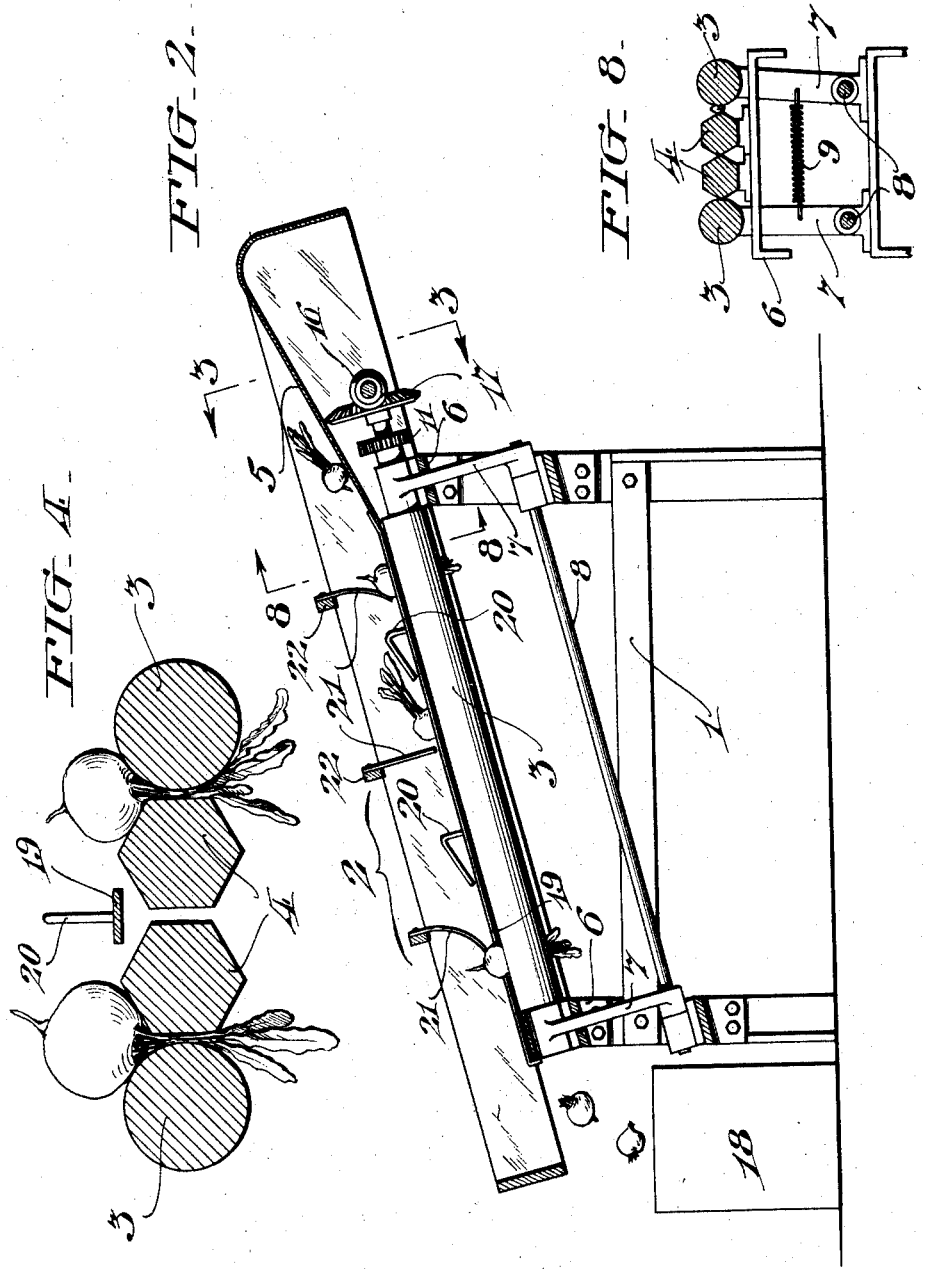
Figure 3:
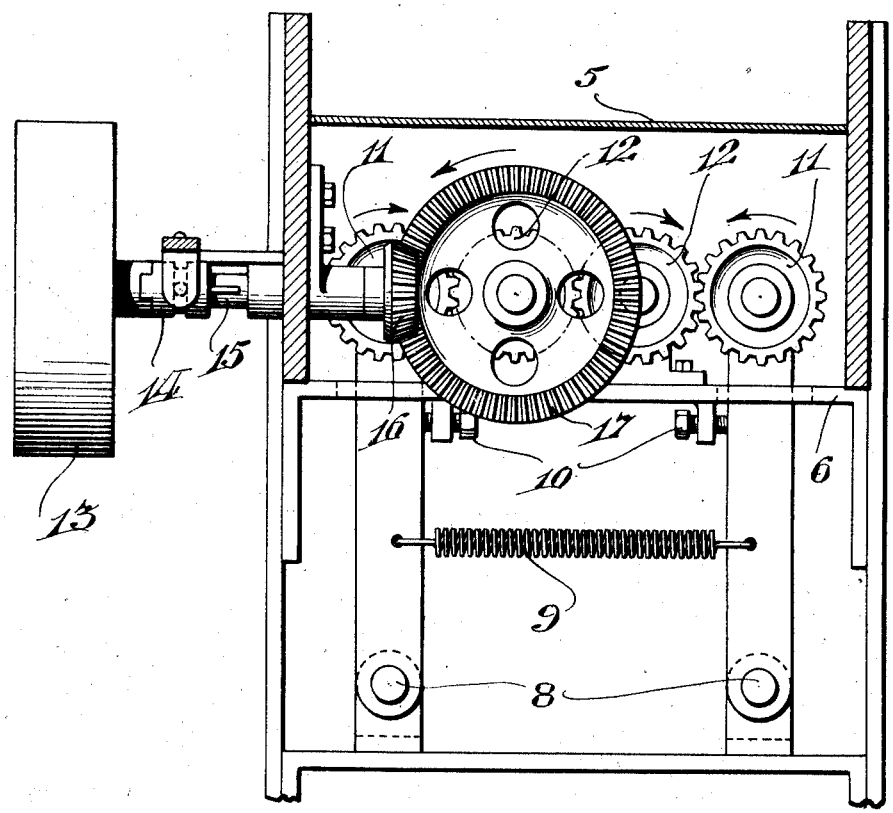

This object, and other advantageous ends which will be described hereinafter, I attain in the following manner, reference being had to the accompanying drawings in which Figure 1 is a plan view of a machine embodying my invention, Figure 2 a longitudinal section on line 2—2 of Figure 1, Figure 3 a section on line 3—3 of Figure 2, Figure 4 a fragmentary cross section showing the cutting rollers in one position, Figure 5 a like view showing the cutting rollers in another position, Figure 6 a fragmentary plan view showing how the vegetables are positioned, Figure 7 a like view showing a vegetable in the position it occupies after the top is removed and before it is discharged from the machine, and Figure 8 a section on line 6—6 of Figure 2.

Referring to the drawings, 1 indicates the frame of the machine, 2 an inclined chute into which vegetables, such as beets, are fed, 3 rollers circular in cross section, 4 a pair of rollers of hexagonal cross section disposed between, closely adjacent to and parallel with rollers 3 and forming the bottom of the chute for the greater part of its length and 5 an inclined plate forming, with the sides of the chute, a hopper adapted to direct the vegetables to the upper faces of the rollers. Rollers 4 are rotatably mounted in bearings in brackets 6 carried by a frame member. Rollers 3 are rotatably mounted in bearings in arms 7 pivoted to rods 8 on each side of the machine and the arms on one side are connected with the arms on the other side by coiled springs 9, the tension of which presses rollers 3 toward rollers 4. Set screws 10 serve as adjustable stops to limit the inward movement of the arms. Gears 11 are fixed to one end of rollers 3 and gears 12 are fixed to one end of one of rollers 4, the gear wheels on one roller meshing with the gears on adjacent rollers. Rotation is imparted to the gears, and consequently to the rollers, by a pulley 13 connected by a clutch 14 to a shaft 15 which carries at its inner end a bevel gear 16 which meshes with a bevel gear 17 fixed to one end of one of the hexagonal rollers 4. Actuation of the pulley imparts rotation in reverse direction to each of the rollers 3 and the adjacent hexagonal roller, the rotation being, as indicated by the arrows in Figure 3, in such direction as to draw the vegetable tops downward between one cylindrical roller and the adjacent hexagonal roller.

Figure 5:
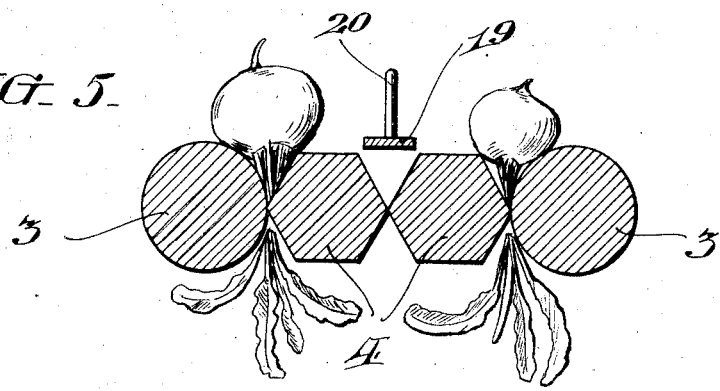

When the machine is in operation the vegetables ride and slide on the tops of the rollers and their tops drop between a cylindrical roller and a hexagonal roller as shown in Figure 4, the tops are pinched off by an angular part of the hexagonal roller, when it contacts with the cylindrical roller, as shown in Figure 5, the tops drop and the vegetables continue their travel until they drop from the tail end of the rollers into a suitable receptacle 18.

To insure proper positioning of the vegetable tops relatively to the rollers, I provide a plate 19 disposed, immediately above the rollers, centrally and longitudinally of the chute, and carrying a series of upwardly extending guide pins 20 which serve to arrest the tops and swing them into the gaps between the cylindrical rollers and the hexagonal rollers as shown in Figure 6, plate 19 also serving to prevent the vegetables or their tops from falling between the two hexagonal rollers. To insure against too rapid progress of the vegetables on the inclined rollers, I preferably provide a series of flexible baffles 21 extending downwardly from bars 22 which extend transversely of the chute.

In case any solid foreign substance, such as a pebble, is fed into the chute, the spring pressed rolls will permit it to pass between the rollers without injury to the machine.

Angular rollers of other than hexagonal shape may be used, but I have found that the angles of a hexagonal roller are effective in pinching off the tops and the hexagonal faces leave a limited space between the upper faces of the cylindrical and the hexagonal rollers and effectively prevent the vegetables from being caught between the rollers.

While I have described my invention as taking a particular form, it will be understood that the various parts may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:—

1. In a vegetable topping machine, the combination of a chute having a plurality of pairs of rollers, each pair of rollers consisting of a roller of hexagonal cross section and a roller of circular cross section, means for directing the tops of the vegetables between the rollers of a pair and for preventing vegetables from falling between rollers of different pairs, and means comprising depending baffles having flexible contacting portions disposed above the chute for controlling the progress of vegetables through the chute.

2. The combination for topping vegetables, of a chute, the bottom of said chute consisting of pairs of rollers, one of the rollers of each said pair being of hexagonal cross section, means for rotating each roller of a pair in a direction opposite to that of the other roller, means for feeding vegetables to the chute, means comprising a plurality of guide pins, each in the form of an upright rod with a portion bent longitudinally and positioned centrally of the chute for preventing the vegetables from coming in contact with two rollers of hexagonal cross section, said last means being adapted to direct the heads of vegetables between the rollers of a pair, and other means for retarding too rapid progress of the vegetables through the chute.

3. The combination in a vegetable topping machine of an inclined chute, rollers extending longitudinally of and forming the bottom of the chute, said rollers being adjustably positioned to allow foreign solid matter to pass therebetween and formed in pairs comprising one circular non-cutting roller and one hexagonal cutting roller, the rollers of each pair rotating toward each other, means comprising a plurality of guide pins disposed centrally and longitudinally of the chute immediately above the rollers to arrest the tops of the vegetables and direct them between a pair of rollers and prevent them from contacting between two cutting rollers, a series of flexible baffles normally depending downwardly from supports above and transversely of the chute for preventing too rapid progress of the vegetables down the chute, the baffles being positioned so that vegetables strike the flexible portions thereof and pass thereunder at retarded speed.

In testimony whereof I have signed my name to this specification.

CHARLES H. AYARS.